United States Patent
Assam

(10) Patent No.: US 10,824,867 B1
(45) Date of Patent: Nov. 3, 2020

(54) AUGMENTED REALITY SYSTEM FOR REAL-TIME DAMAGE ASSESSMENT

(71) Applicant: STATE FARM MUTUAL AUTOMOBILE INSURANCE COMPANY, Bloomington, IL (US)

(72) Inventor: Lee Marvin John Assam, El Paso, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 110 days.

(21) Appl. No.: 16/050,316

(22) Filed: Jul. 31, 2018

Related U.S. Application Data

(60) Provisional application No. 62/540,229, filed on Aug. 2, 2017.

(51) Int. Cl.
*G06T 19/00* (2011.01)
*G06K 9/00* (2006.01)
*H04W 4/021* (2018.01)

(52) U.S. Cl.
CPC ..... *G06K 9/00671* (2013.01); *G06K 9/00637* (2013.01); *G06T 19/006* (2013.01); *H04W 4/021* (2013.01)

(58) Field of Classification Search
CPC ............ G06K 9/00671; G06K 9/00637; G06T 19/006; H04W 4/021
See application file for complete search history.

(56) References Cited

U.S. PATENT DOCUMENTS

| | | | |
|---|---|---|---|
| 10,423,832 B1* | 9/2019 | Zhang | G06K 9/4604 |
| 2017/0286993 A1* | 10/2017 | Khalid | G06Q 30/0241 |
| 2018/0159838 A1* | 6/2018 | Dintenfass | G06T 19/006 |
| 2018/0188831 A1* | 7/2018 | Lyons | G06F 3/04815 |
| 2018/0350137 A1* | 12/2018 | Skidmore | G06T 19/006 |
| 2018/0357922 A1* | 12/2018 | Dutta | G06F 3/011 |
| 2019/0004618 A1* | 1/2019 | Tadros | G06K 9/00624 |
| 2019/0020816 A1* | 1/2019 | Shan | G06K 9/22 |
| 2019/0020817 A1* | 1/2019 | Shan | H04N 5/77 |
| 2019/0355177 A1* | 11/2019 | Manickam | G02B 27/0172 |

* cited by examiner

*Primary Examiner* — Santiago Garcia
(74) *Attorney, Agent, or Firm* — Lee & Hayes, P.C.

(57) ABSTRACT

A method and system for improving damage assessment by automatic measurement of virtual objects within an augmented reality (AR) representation of a physical environment are disclosed. A user interacts with a mobile computing device to position and resize virtual objects within a virtual space corresponding to a physical environment, which is presented to the user as an AR environment generated by the mobile computing device. The virtual objects are positioned and sized to match damaged physical objects within the physical environment. The sizes of the physical objects are automatically determined using the virtual sizes of the virtual objects, which physical sizes are further used to determine the extent of damage.

20 Claims, 10 Drawing Sheets

AUGMENTED REALITY SYSTEM FOR REAL-TIME DAMAGE ASSESSMENT

CROSS-REFERENCE TO RELATED APPLICATIONS

The present application claims the benefit of U.S. Provisional Application No. 62/540,229 (filed Aug. 2, 2017), the entirety of which is incorporated herein by reference.

TECHNICAL FIELD

The present disclosure generally relates to a system and a method for improving automated damage assessment by determining characteristics of objects within a physical environment based upon characteristics of virtual objects within an augmented reality environment.

BACKGROUND

The extent of damage to a building, vehicle, or other object can frequently be assessed based upon the dimensions of an area or object affected. For example, wind damage to siding on a house can be determined based upon the area of siding damaged. When such damage occurs, however, it is often difficult or dangerous to obtain accurate measurements or estimates of the extent of damage. For example, fire may compromise a building's structural integrity, inhibiting measurement of upper-story windows or roofing. As another example, measuring damaged sections of roofing shingles may require physically accessing the roof in order to determine the extent of the damaged area. Even under more favorable conditions, measurement or estimation of extent of damage may require inspection by a person skilled in damage assessment techniques. Improving measurements of damaged areas or objects is necessary in order to improve remediation of damage.

SUMMARY

The present application discloses methods, systems, and computer-readable media storing instructions for automatically assessing an extent of damage or loss in a physical environment using an augmented reality representation of a virtual space corresponding to the physical environment. This may include capturing visual data regarding the physical environment; generating a virtual space based upon the captured visual data regarding the physical environment; receiving a user selection of a virtual object to place within the virtual space; presenting the virtual object within the virtual space based upon the user selection; receiving a user indicator of a size of the virtual object within the virtual space at a location within the virtual space; determining a physical size of the physical object in the physical environment based upon the size of the virtual object within the virtual space; accessing data regarding costs associated with the physical object; determining a cost associated with repairing or replacing the physical object based upon the accessed data and the determined size of the virtual object; and/or presenting an indication of the determined cost associated with repairing or replacing the physical object to the user. Any of the foregoing may be performed by components of a mobile device. For example, the visual data may be captured using a camera of a mobile device. Likewise, a display of the mobile device may be used to present information to a user, while an input of the mobile device may be used to receive user input, selections, or instructions. A memory of the mobile device may store executable instruction on a computer-readable medium for implementing part or all of the foregoing.

The virtual object may be associated with a physical object to be repaired or replaced within the physical environment. In some embodiments, the physical object may be one or more of the following components of a building structure: a window, a door, a drywall wall segment, a brick wall segment, a stone wall segment, a siding segment, a roofing shingle segment, a carpet floor segment, a tile floor segment, a wood floor segment, or a concrete floor segment. In other embodiments, the physical object may be one or more of the following components of a vehicle: a windshield, a bumper, a hood, a door, a side view mirror, a wheel, a light housing, a trunk, a roof panel, or a side panel. In further embodiments, receiving the user selection of the virtual object may include (i) receiving a first user selection of a type of the virtual object and (ii) receiving a second user selection of the location of the virtual object within the virtual space.

Additionally, or alternatively, a pointer object may be placed within the virtual space to indicate a location or condition of relevance to damage assessment. For example, the pointer object may be associated with a user comment regarding an additional condition to be repaired within the physical environment. A microphone of a mobile device may be used to record a user comment as an audio comment associated with the pointer object. A user indication of a condition location of such a pointer object may be received from the user, and the pointer object may be displayed within the virtual space. In some such embodiments, determining the cost associated with repairing or replacing the physical object may further include determining one or more costs associated with the pointer object based upon the pointer object (e.g., based upon a user comment associated with the pointer object).

In further embodiments, a geographic location of the physical environment may be determined. The geographic location may be determined using a Global Positioning System (GPS) receiver of a mobile device. Accessing the data regarding costs associated with the physical object may, thus, include accessing data associated with costs within an area including the geographic location. In some such embodiments, determining the cost associated with repairing or replacing the physical object may further include determining one or more costs within the area including the geographic location. The one or more costs may include costs associated with materials or costs associated with labor.

In yet further embodiments, a report may be generated regarding the determined cost associated with repairing or replacing the physical object. The report may include information indicating such cost, as well as one or more images of the physical environment and/or the virtual object. The one or more images may be generated as two-dimensional images for the report. The report may be presented to the use via the mobile device and/or stored in a memory for further use.

Systems or computer-readable media storing instructions for implementing all or part of the systems and methods described above may also be provided in some aspects. Systems for implementing such methods may include or one or more mobile computing devices and/or one or more servers. Additional or alternative features described hereinafter may be included in some aspects.

BRIEF DESCRIPTION OF THE DRAWINGS

The figures described below depict various aspects of the applications, methods, and systems disclosed herein. It should be understood that each figure depicts an embodiment of one or more particular aspects of the disclosed applications, systems and methods, and that each of the figures is intended to accord with one or more possible embodiments thereof. Furthermore, wherever possible, the following description refers to the reference numerals included in the following figures, in which features depicted in multiple figures are designated with consistent reference numerals.

DETAILED DESCRIPTION

The systems and methods described herein improve damage assessment by improving measurement of damaged objects, components, or areas within a physical environment. In contrast to existing techniques, the techniques herein determine physical sizes of objects or areas indirectly by reference to virtual sizes of virtual objects within a virtual space corresponding to the physical environment. A user indicates the locations, shapes, orientations, and sizes of virtual objects within the virtual space using an augmented reality (AR) system operation on a mobile computing device. The virtual objects may be thus adjusted to accurately represent the damaged physical objects or damaged areas. The virtual sizes of these adjusted virtual objects may then automatically converted to physical dimensions of the corresponding damaged physical objects or areas. The extent of damage may then be automatically assessed based upon this size data, as discussed further below. Such techniques of assessing damage based upon virtual objects improve upon existing techniques in measuring damaged objects and in using such measurements of damaged objects.

The exemplary methods automatically determine sizes of physical objects within the physical environment using the corresponding virtual sizes of virtual objects within the virtual space. This improves upon existing techniques of physical measurement by enabling measurement from some distance (e.g., from several feet or yards away), which is useful when access to the physical object is difficult or dangerous (e.g., in a structurally unsound building or on the exterior of the top floor of a multi-story building). This also improves upon existing techniques of using comparisons of distances in static images both because such techniques require a physical object of known length to be placed near the measured object (resulting in the same problems just described) and because such techniques are often limited by the angle at which the image is captured. Image angle becomes a particular problem for images captured closer to the object, while images captured further from the object suffer from reduced accuracy due to their distance. In contrast, the techniques described herein avoid both problems by using virtual objects within a virtual space, thereby improving measurement accuracy and availability for damage assessment. The systems and methods described below thereby improve damage assessment by using an augmented reality representation of objects within a virtual space to determine dimensions (i.e., sizes and shapes) of physical objects and automatically determine extent of damage based upon such physical object dimensions.

System Overview

Figure 1:
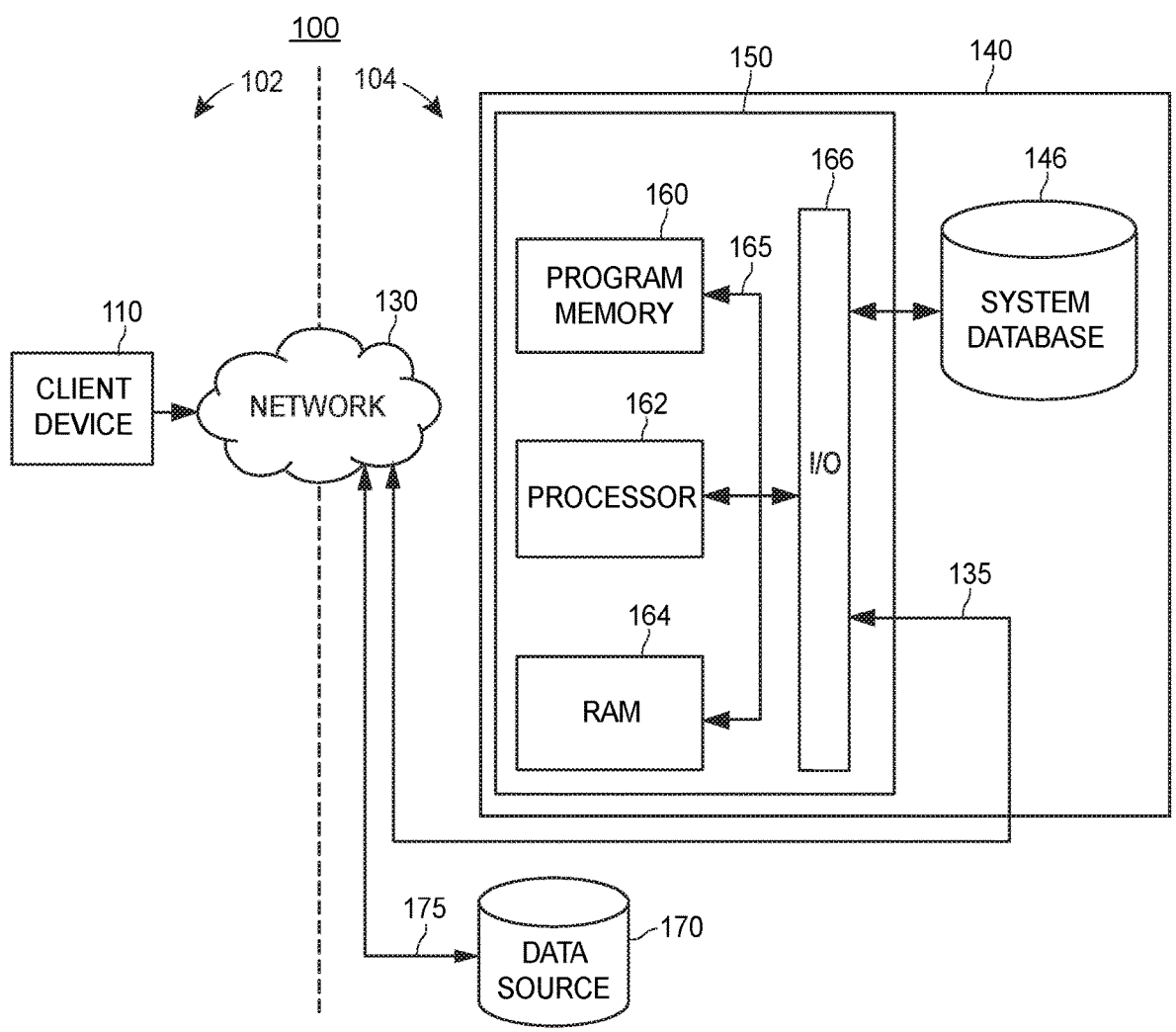
FIG. 1 illustrates a block diagram of an exemplary augmented reality damage assessment system on which the methods described herein may operate in accordance with the described embodiments.

FIG. 1 illustrates a block diagram of an exemplary augmented reality damage assessment system 100. The high-level architecture includes both hardware and software applications, as well as various data communications channels for communicating data between the various hardware and software components. The augmented reality damage assessment system 100 may be roughly divided into front-end components 102 and back-end components 104. The front-end components 102 allow a user to interact with a virtual space (i.e., an augmented reality representation of a local physical environment) via a mobile computing device 110. The front-end components 102 may communicate with the back-end components 104 via a network 130. The back-end components 104 may include one or more servers 140 that may communicate with the front-end components 102 and/or data sources 170. The servers 140 may perform data processing and/or provide information based upon information received from the front-end components 102, as described further herein. The one or more data sources 170 may be connected to the front-end components 102 or to the servers 140 to provide information for damage assessment via the network 130 via link 175. Such data sources 170 may include databases of costs for repairing or replacing damaged components or items. In alternative embodiments, the augmented reality damage assessment system 100 may consist of only the front-end components 102, without necessarily connecting to the back-end components 104 via a network 130.

The front-end components 102 may be disposed within one or more mobile computing devices 110, which may include a desktop computer, notebook computer, netbook computer, tablet computer, or mobile device (e.g., smart phone, wearable computer, computer headset, etc.). In a preferred embodiment, the mobile computing device 110 may be a general use smartphone or tablet computer with at least one image capture device (e.g., a digital camera) and a touchscreen display. In some embodiments, the mobile computing device 110 may be a thin-client device, wherein much or all of the computing processes are performed by the server 140, with information communicated between the thin-client mobile computing device 110 and the server 140 via the network 130. The mobile computing device 110 may include any number of internal sensors and may be further communicatively connected to one or more external sensors by any known wired or wireless means (e.g., USB cables, Bluetooth communication, etc.). The mobile computing device 110 is further discussed below with respect to FIG. 2.

In some embodiments, the front-end components 102 may communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 may include one or more servers 140 communicatively connected to the network 130 by a link 135. Each server 140 may include one or more processors 162 adapted and configured to execute various software applications and components of the system 100, in addition to other software applications. The server 140 may further include a database 146, which may be adapted to store data related to the system 100, such as types or templates of virtual objects, cost data associated with corresponding physical objects, or similar data. The server 140 may access data stored in the database 146. The server 140 may have a controller 150 that is operatively connected to the database 146. It should be noted that, while not shown, additional databases may be linked to the controller 150 in a known manner. The controller 150 may include a program memory 160, a processor 162, a RAM 164, and an I/O circuit 166, all of which may be interconnected via an address/data bus 165. It should be appreciated that although only one microprocessor 162 is shown, the controller 150 may include multiple microprocessors 162. Similarly, the memory of the controller 150 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example.

The server 140 may further include a number of software applications or routines stored in a program memory 160. In some embodiments, these applications or routines may form modules when implemented by the processor 162, which modules may implement part or all of the methods described below to generate or interact with user interfaces of the mobile computing device 110 or to generate damage assessment data based upon information from the mobile computing device 110. In some embodiments, such modules may include one or more of a configuration module, an analysis module, or a response module. In further embodiments, the various software applications may include a web server application responsible for generating data content to be included in web pages, including web pages sent from the server 140 to the mobile computing device 110 or to other computing devices for storage or review.

The back-end components 104 may further include one or more data sources 170, communicatively connected to the network 130 via link 175. The data sources 170 may include public or proprietary databases storing information that may be associated with a user of the mobile computing device 110, custom virtual object classes or types, average costs for repairing building components, average costs for replacing building components, or other data related to damage assessment. Additionally, or alternatively, the data sources 170 may include databases maintained by another entity, such as a manufacturer or reseller of building materials. In some embodiments, the data source 170 may further execute software programs or applications as a web server.

Figure 2:
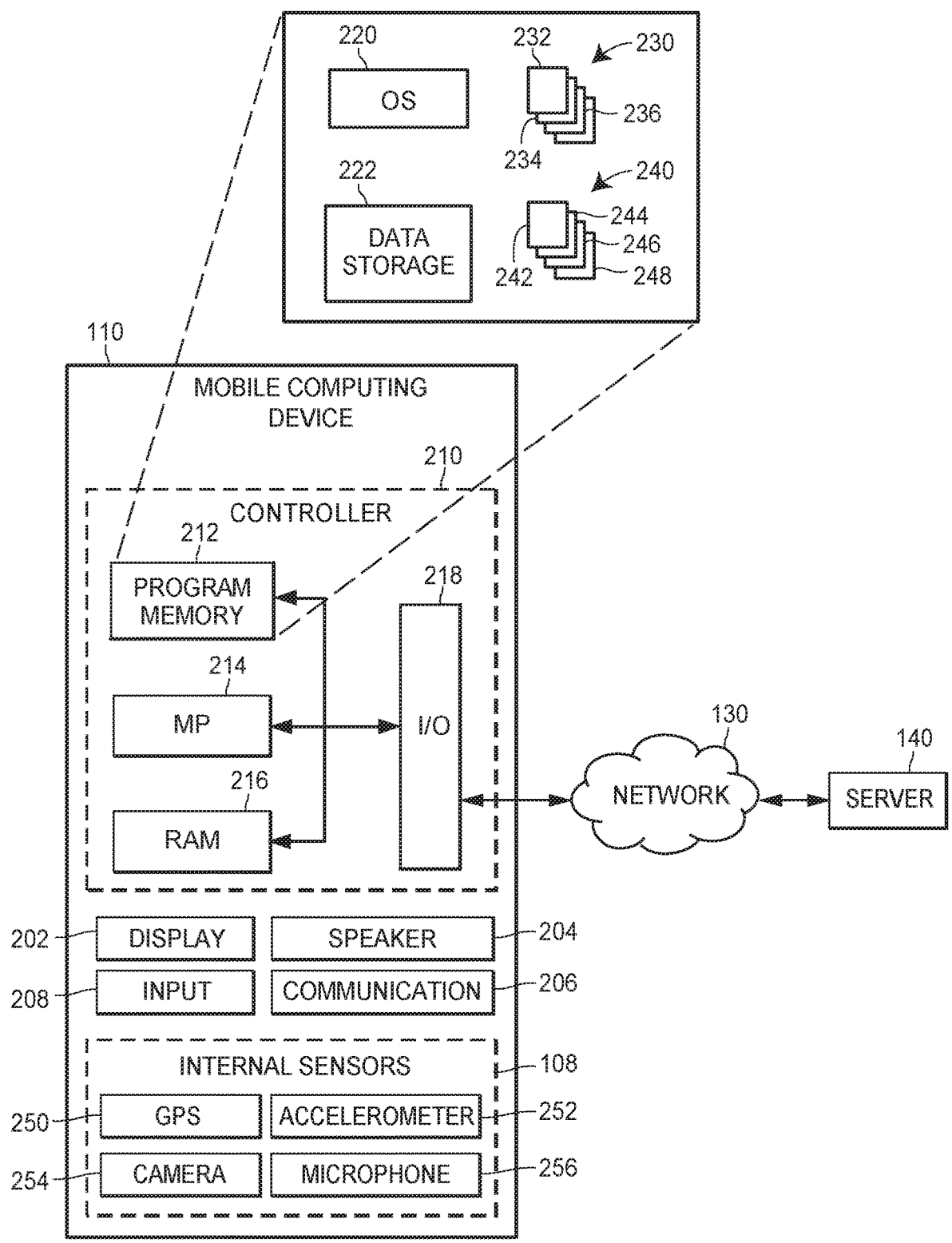
FIG. 2 illustrates a block diagram of an exemplary mobile computing device for use in augmented reality damage assessment, in accordance with the embodiments described herein.

FIG. 2 illustrates a block diagram of an exemplary mobile computing device 110 in accordance with the augmented reality damage assessment system 100. Such mobile computing device 110 may be a smartphone, a tablet computer, or similar mobile device capable of receiving and processing electronic information. The mobile computing device 110 may include one or more sensors 108, which may provide sensor data regarding a local physical environment in which the mobile computing device 110 is operating. Such sensor data may include 2-D or 3-D images of the local physical environment, which may be captured by a camera 254 of the mobile computing device 110. Additionally, in some embodiments, the mobile computing device 110 may receive sensor data from one or more external sensors. The sensor data may be processed by the controller 210 to generate a virtual space for user interaction, as discussed elsewhere herein. Additionally, or alternatively, the sensor data may be sent to one or more processors 162 of the server 140 through the network 130 for processing.

When the controller 210 (or other processor) generates the virtual space, a representation of the virtual space may be presented to the user of the mobile computing device 110 using a display 202 or other output component of the mobile computing device 110. User input may likewise be received via an input 208 of the mobile computing device 110. Thus, the mobile computing device 110 may include various input and output components, units, or devices. The display 202 and speaker 204, along with other integrated or communicatively connected output devices (not shown), may be used to present information to the user of the mobile computing device 110 or others. The display 202 may include any known or hereafter developed visual or tactile display technology, including LCD, OLED, AMOLED, projection displays, refreshable braille displays, haptic displays, or other types of displays. The one or more speakers 206 may similarly include any controllable audible output device or component, which may include a haptic component or device. In some embodiments, communicatively connected speakers 206 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The mobile computing device 110 may further include sensors 108. In some embodiments, additional external sensors may be communicatively connected to the mobile computing device, either directly or through the network 130. The sensors 108 may include any devices or components mentioned herein, other extant devices suitable for capturing data regarding a physical environment, or later-developed devices that may be configured to provide data regarding a physical environment (including components of structures or objects within the physical environment). The sensors 108 of the mobile computing device 110 may further include additional sensors configured or intended for other uses, such as geolocation, movement tracking, photography, or spatial orientation of the device. Such additional sensors may, nonetheless, be used to provide sensor data for capturing data regarding the local physical environment to generate a corresponding virtual space, as discussed herein.

Although discussion of all possible sensors of the mobile computing device 110 would be impractical, if not impossible, several sensors warrant particular discussion. Disposed within the mobile computing device 110, the sensors 108 may include a GPS unit 250, an accelerometer 252, a camera 254, and a microphone 256. Any or all of these may be used to generate sensor data used in generating a virtual space representation of the physical environment or items therein. Additionally, other types of currently available or later-developed sensors may be included in some embodiments.

The GPS unit 250 and the accelerometer 252 may provide information regarding the location or movement of the mobile computing device 110. The GPS unit 250 may use "Assisted GPS" (A-GPS), satellite GPS, or any other suitable global positioning protocol (e.g., the GLONASS system operated by the Russian government) or system that locates the position of the mobile computing device 110. For example, A-GPS utilizes terrestrial cell phone towers or Wi-Fi hotspots (e.g., wireless router points) to more accurately and more quickly determine location of the mobile computing device 110, while satellite GPS generally is more useful in more remote regions that lack cell towers or Wi-Fi hotspots. The accelerometer 252 may include one or more accelerometers positioned to determine the force and direction of movements of the mobile computing device 110. In some embodiments, the accelerometer 252 may include a separate X-axis accelerometer, Y-axis accelerometer, and Z-axis accelerometer to measure the force and direction of movement in each dimension respectively. It will be appreciated by those of ordinary skill in the art that a three dimensional vector describing a movement of the mobile computing device 110 through three dimensional space can be established by combining the outputs of the X-axis, Y-axis, and Z-axis accelerometers using known methods.

Similarly, other components may provide additional positioning or movement sensor data. In some embodiments, a gyroscope may be used in addition to, or instead of, the accelerometer 252 to determine movement of the mobile computing device 110. For example, a MEMS gyroscope may be included within the mobile computing device 110 to detect movement of the mobile computing device 110 in three dimensional space. Of course, it should be understood that other types of gyroscopes or other types of movement-detecting sensors may be used in various embodiments. Such sensor data may be used to determine a relative position of the mobile computing device 110 within the physical environment. Such relative position information may be combined with other sensor data (such as visual image data from a camera 254) to provide data from which the mobile computing device 110 can generate a virtual space. For example, multiple two-dimensional (2-D) images of the same object within the physical environment may be compared based upon relative position information to determine the size, distance, and three-dimensional (3-D) shape of the object based upon differences between the images.

The camera 254 may be used to capture still or video images of the local physical environment of the mobile computing device 110 in the visual spectrum or other wavelengths, as well as objects or structures within the local physical environment. Such images may be used to generate and utilize virtual spaces corresponding to physical environments in order to facilitate automated damage or loss assessment. The one or more cameras 254 may include digital cameras or other similar devices, such as charge-coupled devices, to detect electromagnetic radiation in the visual range or other wavelengths. It will be readily understood that one or more cameras 254 may be disposed within the mobile computing device 110 and configured to generate either still images or video recordings. For example, multiple cameras 254 may be disposed to obtain stereoscopic images of the physical environment, thereby better enabling the mobile computing device 110 to generate virtual space representations of the physical environment. It will further be understood that many smartphones or tablet computers include front and back solid state digital cameras, which may be used to simultaneously obtain images of a large portion of the area before and behind the phone or tablet. Additional cameras 254 may also be communicatively connected to the mobile computing device 110, including webcams or dashcams. In some embodiments, the camera 254 may include an infrared illuminator or other device to stimulate emission within a targeted range. Such infrared illuminators may be automatically activated when light is insufficient for image capturing. Additional or alternative sensors 108 may be included in some embodiments to capture data regarding locations and shapes of objects within the physical environment.

The microphone 256 may be used to detect sounds within the local physical environment 106, such as spoken notes or comments by the user of the mobile computing device 110. One or more microphones 256 may be disposed within the mobile computing device 110 or may be communicatively connected thereto. For example, wired or wireless microphones 256 may be communicatively connected to the mobile computing device 110, such as wireless speaker/microphone combination devices communicatively paired with the mobile computing device 110.

The mobile computing device 110 may also communicate with the server 140, the data source 170, or other components via the network 130. Such communication may involve the communication unit 206, which may manage communication between the controller 210 and external devices (e.g., network components of the network 130, etc.). The communication unit 206 may further transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 206 may also be capable of communicating using a near field communication standard (e.g., ISO/IEC 18092, standards provided by the NFC Forum, etc.). Furthermore, the communication unit 206 may provide input signals to the controller 210 via the I/O circuit 218. The communication unit 206 may also transmit sensor data, device status information, control signals, or other output from the controller 210 to the server 140 or other devices via the network 130.

The mobile computing device 110 may further include a controller 210. The controller 210 may receive, process, produce, transmit, and store data. The controller 210 may include a program memory 212, one or more microcontrollers or microprocessors (MP) 214, a random access memory (RAM) 216, and an I/O circuit 218. The components of the controller 210 may be interconnected via an address/data bus or other means. It should be appreciated that although FIG. 2 depicts only one microprocessor 214, the controller 210 may include multiple microprocessors 214 in some embodiments. Similarly, the memory of the controller 210 may include multiple RAM 216 and multiple program memories 212. Although the FIG. 2 depicts the I/O circuit 218 as a single block, the I/O circuit 218 may include a number of different I/O circuits, which may be configured for specific I/O operations. The microprocessor 214 may include one or more processors of any known or hereafter developed type, including general-purpose processors or special-purpose processors. Similarly, the controller 210 may implement the RAM 216 and program memories 212 as semiconductor memories, magnetically readable memories, optically readable memories, or any other type of memory.

The program memory 212 may include an operating system 220, a data storage 222, a plurality of software applications 230, and a plurality of software routines 240. The operating system 220, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 222 may include data such as user profiles and preferences, application data for the plurality of applications 230, routine data for the plurality of routines 240, and other data necessary to interact with the server 140 through the digital network 130. In some embodiments, the controller 210 may also include, or otherwise be communicatively connected to, other data storage mechanisms (e.g., one or more hard disk drives, optical storage drives, solid state storage devices, etc.) that reside within the mobile computing device 110. Moreover, in thin-client implementations, additional processing and data storage may be provided by the server 140 via the network 130.

The software applications 230 and routines 240 may include computer-readable instructions that cause the processor 214 to implement the augmented reality and damage assessment functions described herein. Thus, the software applications 230 may include a virtual space management application 232 to generate the virtual space and display objects therein, a damage assessment application 234 to determine the extent of damage based upon objects in the virtual space, and a network communication application 236 to receive and transmit data via the network 130. The software routines 240 may support the software applications 230 and may include routines such as an image capture routine 242 to process image data from the camera 254, a virtual object placement routine 244 for setting and maintaining the locations of virtual objects within the virtual space, a virtual object adjustment routine 246 to resize and reshape virtual objects, and a virtual object measurement routine 248 to determine physical dimensions or measurements of objects represented by the virtual objects within the virtual space. It should be understood that additional or alternative applications 230 or routines 240 may be included in the program memory 212, including web browsers or other applications of the sort ordinarily stored on a mobile devices.

In some embodiments, the mobile computing device 110 may include a wearable computing device or may be communicatively connected to a wearable computing device. In such embodiments, part or all of the functions and capabilities of the mobile computing device 110 may be performed by or disposed within the wearable computing device. Additionally, or alternatively, the wearable computing device may supplement or complement the mobile computing device 110. For example, the wearable computing device 110 may be a smart watch or head-mounted display, either of which may include one or more cameras to capture data regarding the physical environment or present representations of the virtual space.

The augmented reality damage assessment system 100 described above and illustrated in FIGS. 1-2 may be used to perform the methods discussed further below. Although the following description of exemplary methods discusses aspects of the invention disclosed herein as being performed by the mobile computing device 110 for clarity, it should be understood that part or all of the methods could be performed by any combination of the mobile computing device 110, the server 140, or other devices, in various embodiments. For example, the mobile computing device 110 may be capable of performing all the steps of the methods herein as a stand-alone device, but it may nonetheless be configured in some embodiments to communicate with the server 140 for estimating damage or loss.

Physical Environment

Figure 3:
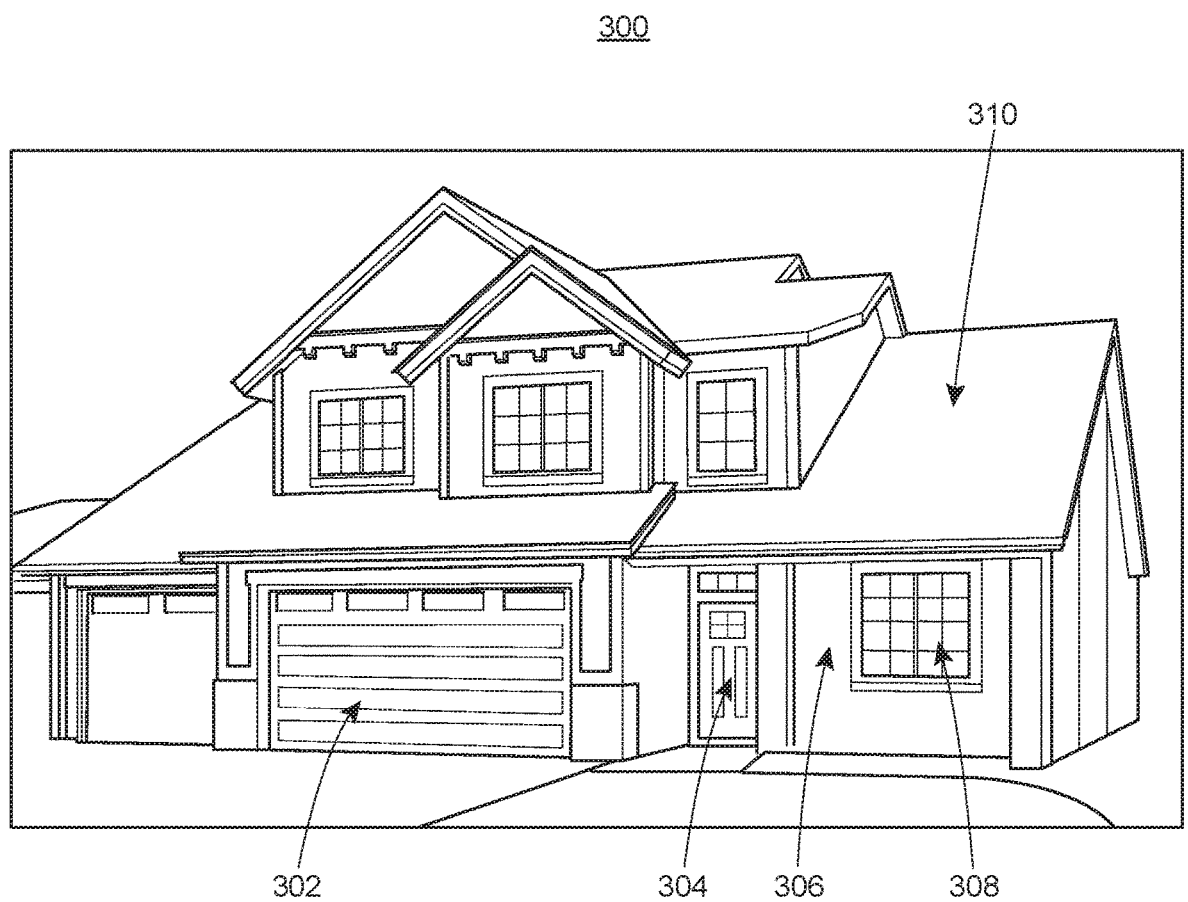
FIG. 3 illustrates an exemplary representation of a physical environment, including various types and locations of damage.

The system described above may be used, as described further herein, to generate a virtual space based upon sensor data regarding a physical environment of the mobile computing device 110. The virtual space may then be used to determine the extent of damage to objects or components of objects within the physical environment using virtual objects within the virtual space, as discussed further below. To better illustrate the operation of the systems and methods described herein, FIG. 3 illustrates an exemplary representation of a physical environment 300. The illustrated physical environment 300 includes a house with various components, any of which may be damaged. Specifically, the house illustrated in the physical environment 300 includes a garage door 302, a door 304, a wall segment 306, a window 308, a roof segment 310, and other similar or related components or segments. Each of these components of the building structure (i.e., components of the house) may suffer damage due to various environmental conditions (e.g., fire, flooding, storm, hail, or wind) or activities (e.g., vandalism, arson, or accidental collision), as well as damage due to ordinary aging of the components.

Although the exemplary physical environment 300 illustrated in FIG. 3 represents a house, it should be understood that other types or components of building structures may suffer the same or similar types of damage. For example, internal environments associated with building structures may likewise be assessed using the systems and methods described herein for similar types of damage or loss. Additionally, the systems and methods described herein may be equally applied to the automated assessment of damage for other types of objects or environments. For example, damage to vehicles may be similarly assessed, as discussed further below.

Virtual Space

To facilitate damage assessment, a virtual space may be generated that corresponds to and represents the physical environment or a part thereof. The virtual space may be graphically represented to the user of the mobile computing device 110 as images presented via the display 202, which may be images of the physical environment from a view point of the mobile computing device 110. Within the mobile computing device 110, the virtual space maps onto the local physical environment in at least three dimensions (i.e., along orthogonal axes representing the spatial dimensions of the physical environment). This mapping enables the placement and manipulation of virtual objects within the virtual space to correspond to locations and dimensions of areas or objects within the physical environment. Such correspondence may then be used to determine the extent of damage or loss, as described further below.

FIGS. 4A-F illustrate an exemplary representation of the physical environment 300 as a virtual space 402. As illustrated, the virtual space 402 may be presented to the user via the display 202 of the mobile computing device 110. Although the virtual space 402 is illustrated throughout FIGS. 4A-F from the same perspective or view point of the mobile computing device 110 for clarity, it should be understood that the virtual space 402 is a 3-D space. As such, representations of the virtual space 402 presented to the user via the display 202 will change as the mobile computing device 110 is repositioned within the physical environment. Thus, the mobile computing device 110 may display images or views of the virtual space 402 to the user that overlay virtual objects over images or representations of views of the physical environment in such manner as to produce an augmented reality (AR) representation of the physical environment. In such an AR representation, the user may view various sides of virtual objects from various positions through the mobile computing device 110, as though the virtual objects were physical objects in three dimensions. To produce such AR representation of the virtual space 402, the mobile computing device 110 may track the relative location and orientation of the mobile computing device 110 as a user moves it through the physical environment. Such tracking may be performed using sensor data from the sensors 108 (e.g., an accelerometer 252), derived features of images captured by one or more cameras 254 (e.g., edges or other well-defined visual features), or a combination of sensor data and derived data.

Figure 4A:
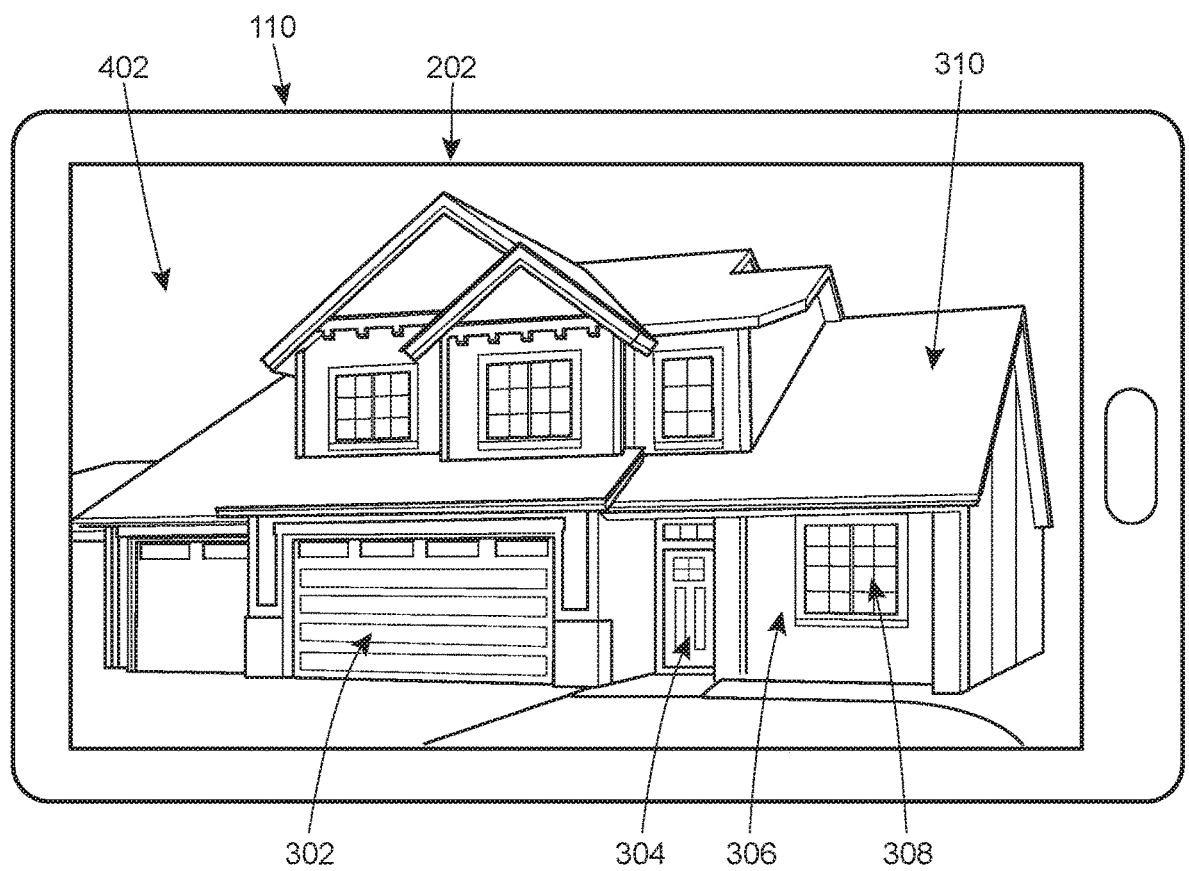
FIG. 4A illustrates an exemplary representation of the physical environment as a virtual space displayed to a user on the exemplary mobile computing device.

FIG. 4A illustrates a representation of a view of the physical environment 300 as a view of the virtual space 402 on the display 202 for a particular location of the mobile computing device 110 within the physical environment. The representation of the virtual space 402 includes representations of the components or features of the building structure in the physical environment, which may include the garage door 302, the door 304, the wall segment 306, the window 308, the roof segment 310, and other similar or related components or segments. The representation of the virtual space 402 presented to the user of the mobile computing device 110 may be an image obtained from the camera 254 or a rendered 2-D image of a 3-D model of the virtual space 402 generated by automatic identification and mapping of positions and dimensions of objects within the physical environment. For example, the mobile computing device 110 may identify edges of objects within images of the physical environment captured by the camera 254 to generate a simplified vertex-based 3-D model of objects within the physical environment. Regardless of whether digital photographic images of the physical environment or simplified models of the physical environment are presented via the display 202 as representations of the virtual space 402, the virtual space 402 allows the overlay of virtual objects or indicators. The virtual objects or indicators may be positioned and manipulated within the virtual environment to occupy specific positions (including location, size, and orientation) within the virtual space 402.

Figure 4B:
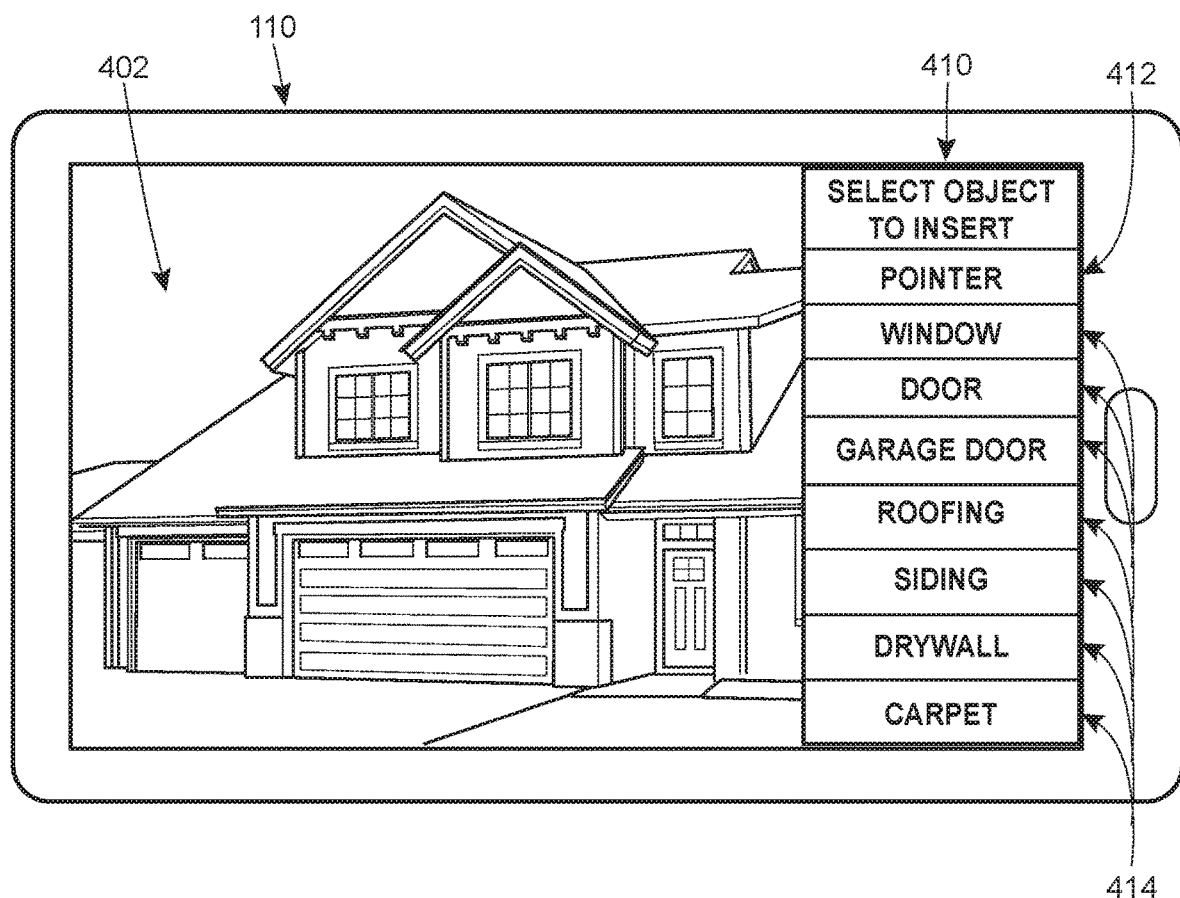
FIG. 4B illustrates an exemplary representation of a virtual object selection interface for adding a virtual object to the virtual space displayed to the user on the exemplary mobile computing device.

FIG. 4B illustrates an exemplary virtual object selection interface 410 configured to enable the user to select a virtual object or indicator to place within the virtual space 402. The virtual object selection interface 410 may include a list of types of objects or other indicators from which the user may select, as shown. Alternative user interfaces may be used that allow a user to place only one type of virtual object, which may then be further identified by a description input by the user. The illustrated virtual object selection interface 410 includes a pointer option 412 to place a virtual pointer object in the virtual space 402. Such pointer objects may be used to indicate notes or characteristics relating to the physical environment or damage thereto. For example, a user may place a pointer object within the virtual space 402 to indicate water damage or a leak within the physical environment. In some embodiments, a plurality of types of pointer options 412 may be presented to the user, each corresponding to a different type of pointer object for indicating different types of information (e.g., water damage, general notes, or comments regarding related virtual objects). The illustrated virtual object selection interface 410 further includes a plurality of virtual object options 414 from which the user may select. Each virtual object option 414 indicates a type of virtual object that may be placed within the virtual space 402 (i.e., a window object, a door object, a garage door object, a roofing object, a siding object, a drywall object, a carpet object, etc.). In some embodiments, one or more of the virtual object options 414 may be associated with a plurality of subtypes of objects, which the user may select or otherwise indicate (e.g., shingle roofing, slate roofing, tile roofing, or metal roofing). The user may select one or more of the options 412 or 414 presented in the virtual object selection interface 410 to place within the virtual space 402. In some embodiments, such selection may be made by tapping and dragging a representation of a pointer object or virtual object to a location within the representation of the virtual space 402 on the display 202. Alternatively, the user may first select a type of virtual object or pointer object to place, then indicate a location within the virtual space 402 to place the virtual object. Placing the virtual object or pointer object may include selecting an area of the display 202 to indicate a size of the virtual object or pointer object, in some embodiments.

Figure 4C:
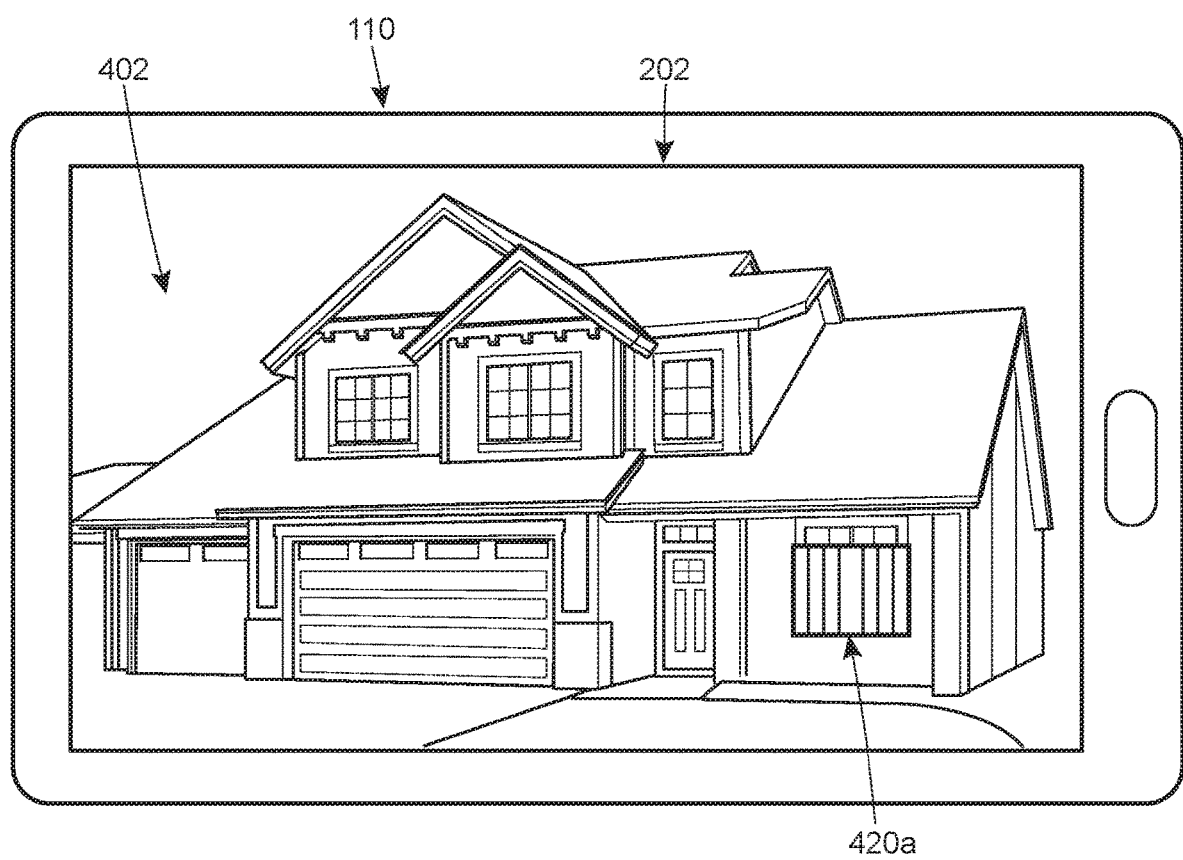
FIG. 4C illustrates an exemplary representation of the virtual space including a virtual object displayed to the user on the exemplary mobile computing device.

FIG. 4C illustrates an exemplary representation of the virtual space 402 with a virtual object 420*a* placed within the virtual space 402. The illustrated virtual object 420*a* is a window object associated with a window (i.e., the window 308) within the physical environment 300. As illustrated, the virtual object 420*a* is placed near a window, but it does not match the size or contours of the window within the virtual space 402. Instead, the virtual object 420*a* may be placed within the virtual space 402 with a default size and shape. Thus, the user may further reposition and resize the virtual object 420*a* within the virtual space 402 to match the location, size, and shape of a corresponding physical object or segment of an object within the physical environment 300.

Figure 4D:
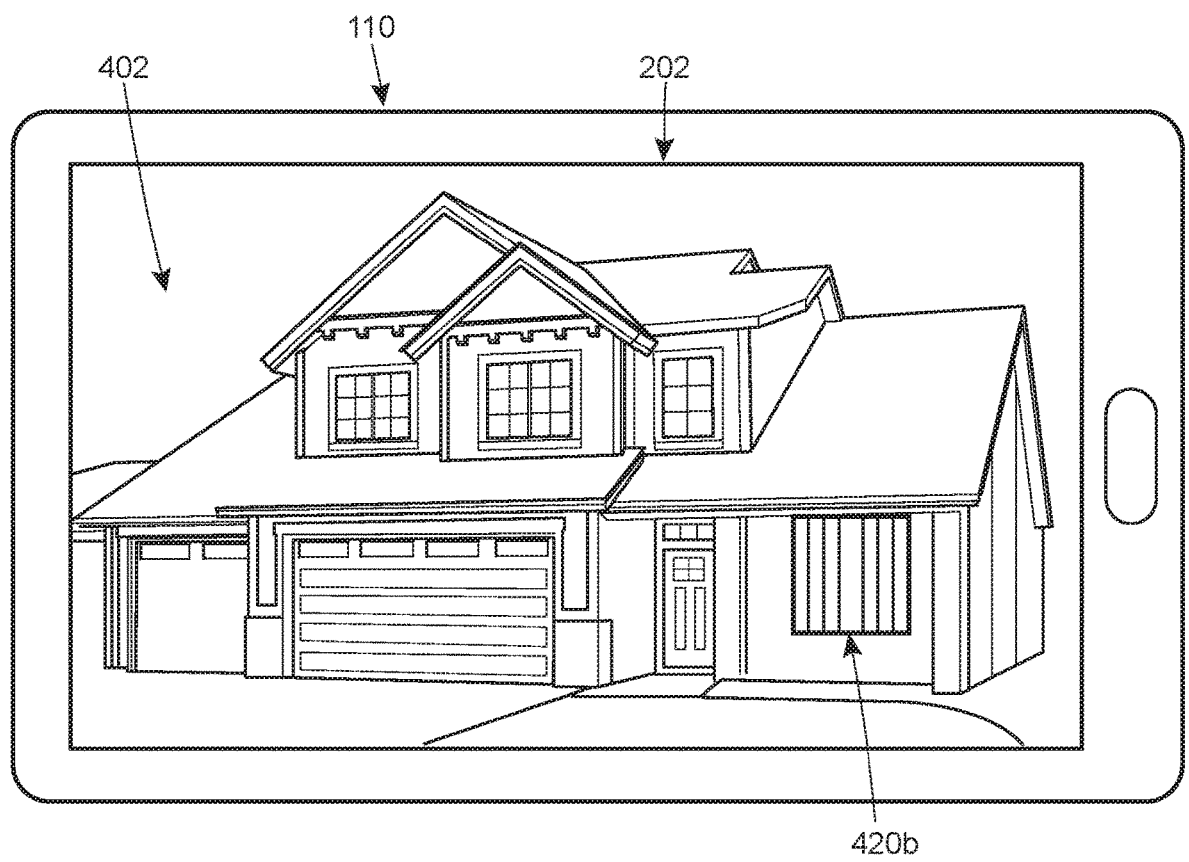
FIG. 4D illustrates an exemplary representation of the virtual space including an adjusted virtual object that has been resized within the virtual space displayed to the user on the exemplary mobile computing device.

FIG. 4D illustrates an exemplary representation of the virtual space 402 including an adjusted virtual object 420*b* that has been adjusted by the user from the virtual object 420*a* to match the window (i.e., the window 308) within the virtual space 402. The adjusted virtual object 420*b* is positioned within the virtual space 402 to match the location, size, and shape of the window within the virtual space 402, which corresponds to the location, size, and shape of the window 308 within the physical environment 300. Thus, the characteristics of the adjusted virtual object 420b correspond to the characteristics of the window 308 within the physical environment 300, which enables automated determination of the physical characteristics of the window 308 by determination of the virtual characteristics of the adjusted virtual object 420b. For example, the physical size and shape of the window 308 may be determined by determining the virtual size and shape of the adjusted virtual object 420b, then converting such virtual size and shape into physical parameters based upon information associated with the virtual space 402, as discussed further below. In some embodiments, the user may further input data associated with the adjusted virtual object 420b, such as text or voice notes or comments to describe features or characteristics of the physical object or segment. For example, the user may note that the window 308 associated with the adjusted virtual object 420b is a double-hung window, a picture window, or casement window. Such additional information may be input by the user or may be selected from a plurality of object property options associated with the adjusted virtual object 420b, in various embodiments.

Figure 4E:
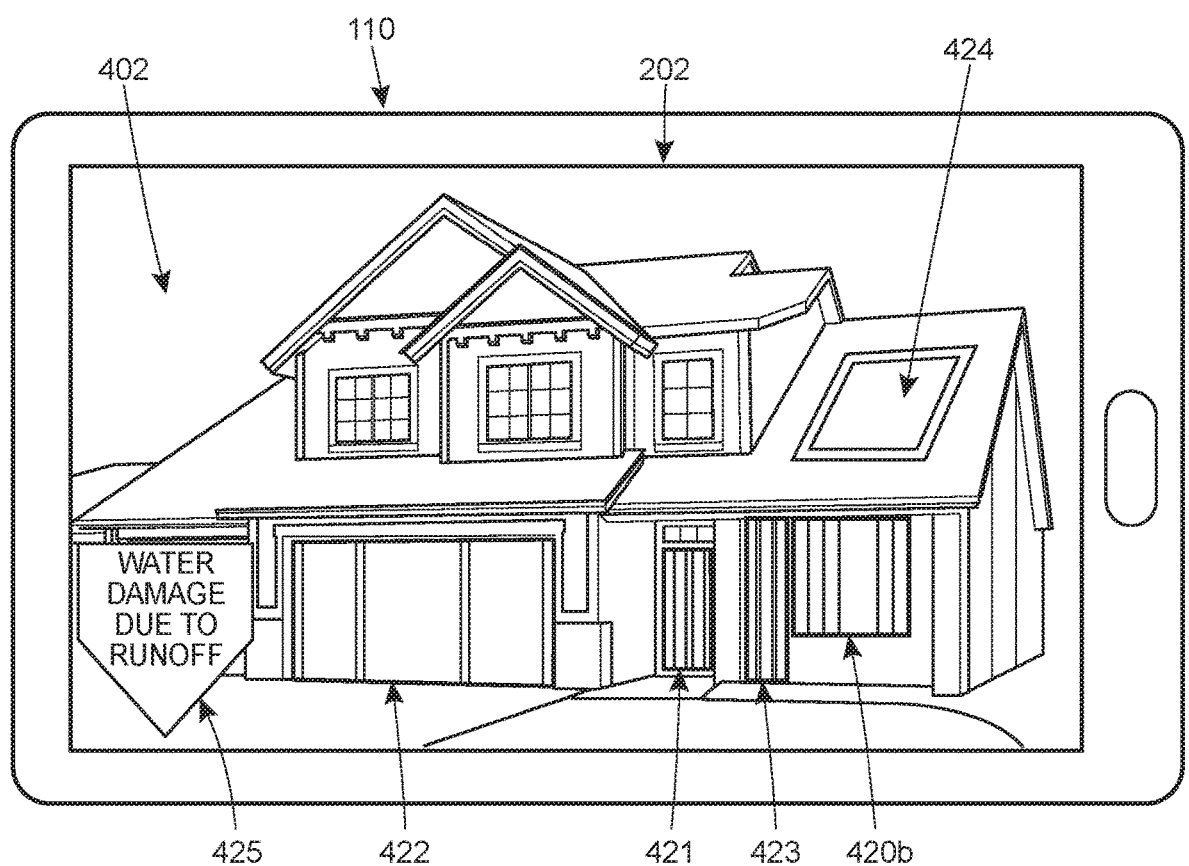
FIG. 4E illustrates an exemplary representation of the virtual space including a plurality of adjusted virtual objects displayed to the user on the exemplary mobile computing device.
Figure 4F:
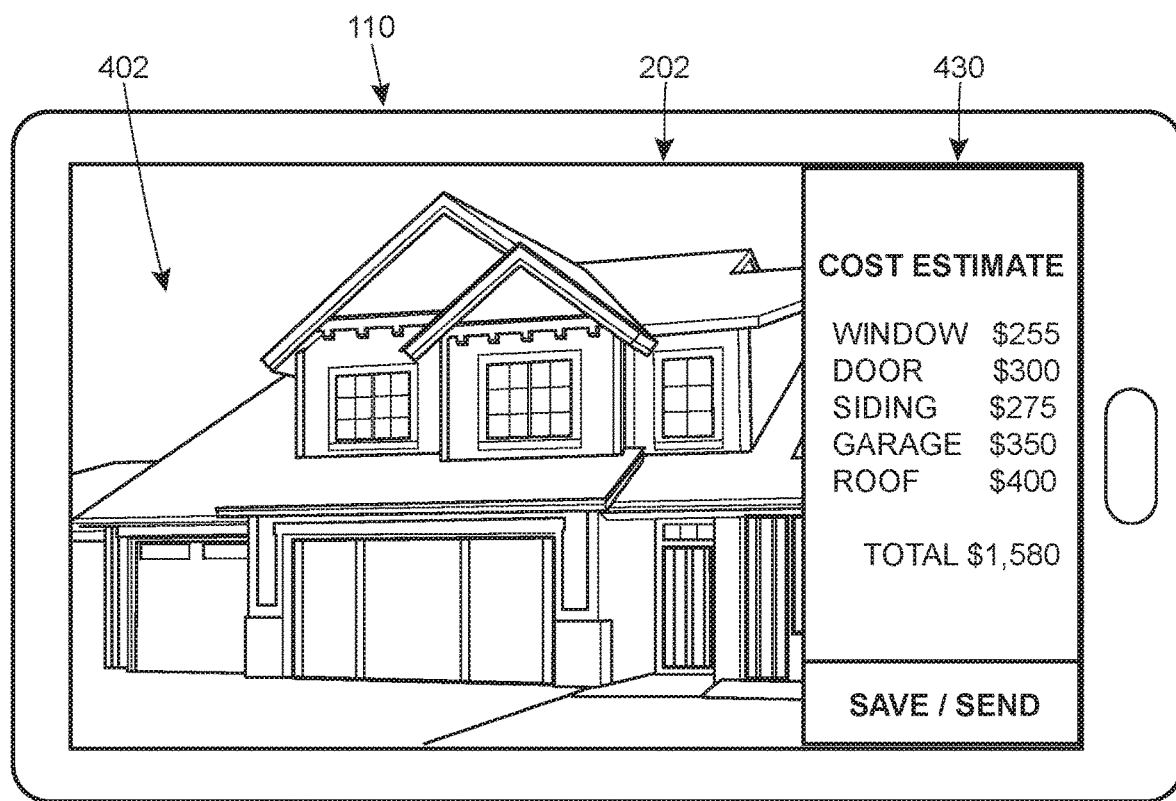
FIG. 4F illustrates an exemplary representation of a damage assessment interface for presenting damage estimates to the user based upon the plurality of adjusted virtual objects within the virtual space displayed to the user on the exemplary mobile computing device.

The user may continue to place and adjust virtual objects (and any pointer objects) within the virtual space 402 to indicate additional objects or segments to evaluate for damage assessment. FIG. 4E illustrates an exemplary representation of the virtual space 402 including virtual objects adjusted to correspond to the garage door 302, the door 304, the wall segment 306, the window 308, and the roof segment 310 in the physical environment 300. The illustrated adjusted virtual objects include the adjusted virtual object 420b (corresponding to the window 308), a second adjusted virtual object 421 (corresponding to the door 304, a third adjusted virtual object 422 (corresponding to the garage door 302), a fourth adjusted virtual object 423 (corresponding to the wall segment 306), and a fifth adjusted virtual object 424 (corresponding to the roof segment 310). As discussed above with respect to the adjusted virtual object 420b, the other adjusted virtual objects 421-424 may be adjusted by the user to match the sizes and shapes of the corresponding structural components of the house, and additional information may be indicated to further identify the features of the structural components corresponding to the other adjusted virtual objects 421-424 (by user selection or descriptive comments).

FIG. 4E also illustrates a pointer object 425 within the virtual space 402 to indicate information not directly associated with a virtual object. Nonetheless, the pointer object 425 may be associated with additional damage or an additional condition within the physical environment 300 requiring repair or remediation. For example, the illustrated pointer object 425 indicates water damage due to runoff that is not directly associated with the adjusted virtual objects. Such water damage may necessitate additional repairs or remediation, which may increase the total assessed damage. Other types of pointer objects may also be placed within the virtual space 402 to provide further information, as discussed elsewhere herein. It should be noted that the pointer object 425 is anchored to a user-indicated position within the virtual space 402, just as the adjusted virtual objects 420b and 421-424 are anchored to particular positions within the virtual space 402.

Once the user is satisfied with the placement and positioning of the adjusted virtual objects and pointer objects within the virtual space 402, the user may interact with an assessment interface 430 to obtain a damage assessment. The damage assessment of the assessment interface 430 may include a cost estimate for repairing or replacing each of the components or objects indicated by the adjusted virtual objects 420b and 421-424. Such cost estimates may include ranges of likely costs, in some embodiments. In further embodiments, such cost estimate may further include automatically generated costs based upon pointer objects 425. In yet further embodiments, the cost estimates associated with the pointer objects 425 may include estimates or ranges entered by a user. Any user-input estimates or ranges may further be supported by supplemental information, including still or video images of damage, receipts, contracts, etc., which supplemental information may be stored in the program memory 212 of the mobile computing device 110 and may be associated with a pointer object 425. In some embodiments, the damage assessment interface 430 may include other types of damage assessment information, such as estimates of time required to repair damage, recommended service providers to perform repairs or remediation, contact information for an insurance representative, covered damage, or other information regarding the damage. The damage assessment interface 430 may further include one or more options to save the assessment, generate a report, or transmit a copy of the assessment or report via the network 130 (e.g., to transmit a report including the assessment to an insurer for processing). If a report is to be generated, the user may move within the physical environment 300 to capture still or video images of any of the adjusted virtual objects within the virtual space 402 to add to the report.

Damage Assessment

To further explain the operation of the invention, exemplary methods using AR representations of a physical environment including damaged areas or objects are described below. The exemplary methods may be implemented by the exemplary augmented reality damage assessment system 100 to generate and present a representation of a virtual space 402 corresponding to a physical environment 300 to a user of a mobile device 110, as discussed above. As discussed, virtual objects may be placed and adjusted within the virtual space by the user, and the sizes of corresponding physical objects within the physical environment may be determined from the sizes of such virtual objects within the virtual space. Thus, the exemplary methods automatically determine sizes of physical objects within the physical environment using the corresponding virtual sizes of virtual objects within the virtual space, which improves upon existing measurement techniques and enables automatic damage assessment. Such exemplary methods enable a mobile device user to indicate damaged areas or components easily and accurately, as well as to automatically generate an assessment of the extent of damage. The AR-based damage assessment may then be used by the user for any purpose for which other types of damage estimates or reports may be used.

Figure 5:
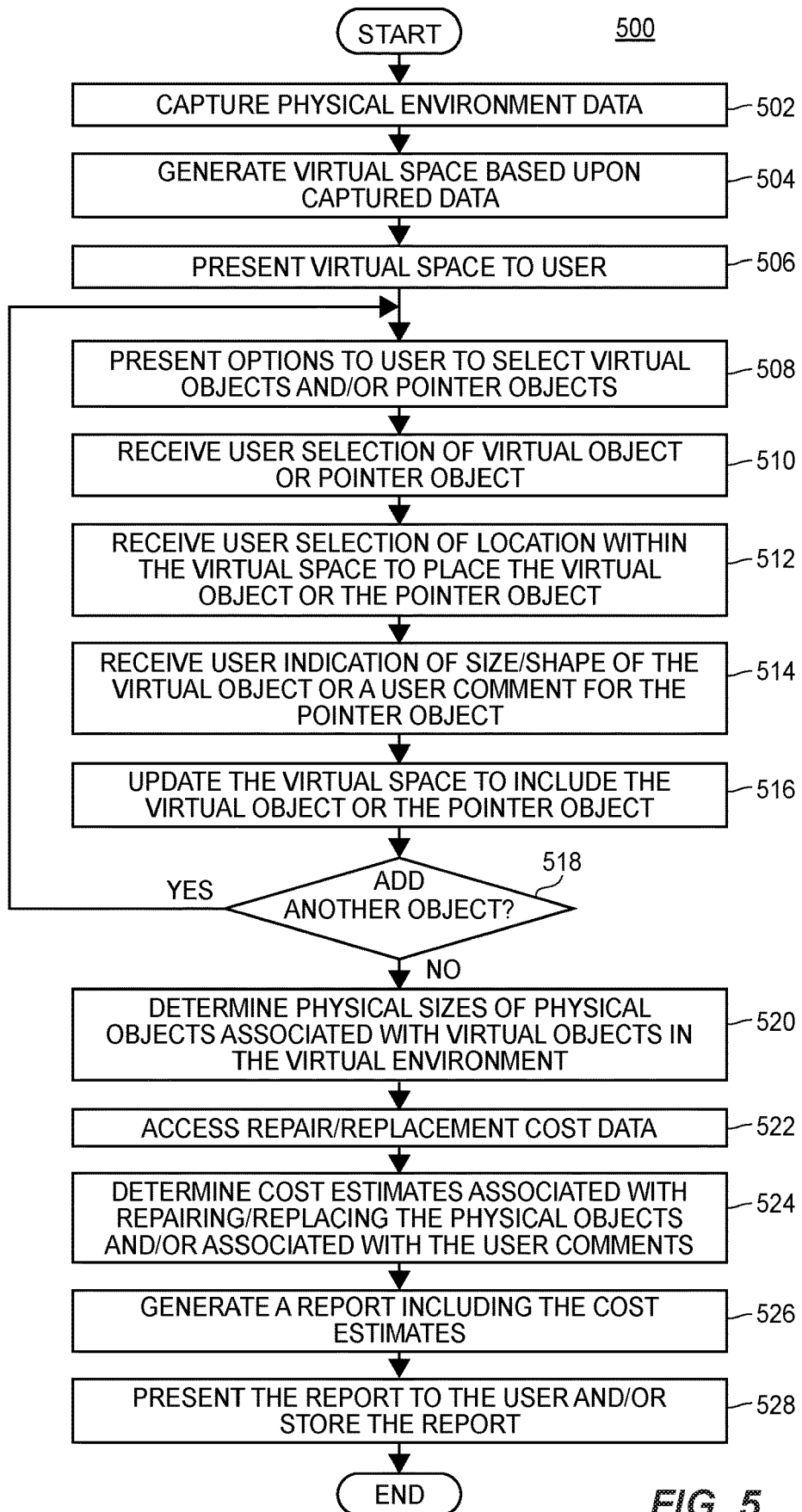
FIG. 5 illustrates a flow diagram of an exemplary augmented reality damage assessment method.

FIG. 5 illustrates an exemplary augmented reality damage assessment method 500 that may be implemented by the mobile computing device 110. The method 500 may begin upon a user indication, such as by running an application on the mobile computing device 100 to capture physical environment data using the sensors 108 (block 502) and use such environmental data to generate a virtual space (block 504). A representation of the virtual space may then be presented to the user via the display 202 (block 506), along with options to allow the user to select virtual objects or pointer objects (block 508). Upon receiving a user selection of a virtual object or pointer object (block 510), a user selection of a location within the virtual space to place the virtual object or pointer object (block 512), and a use indication of a size, shape, or comment for the virtual object or pointer object (block 514), the mobile computing device 110 may update the virtual space to include the adjusted or unadjusted virtual object or pointer object (block 516). As described above, the virtual space may also be updated immediately following each of the user selections, and updating the virtual space may include presenting an updated representation of the virtual space to the user via the display 202. The mobile computing device 110 may determine whether the user indicates a desire to add another virtual or pointer object (block 518). If another virtual object or pointer object is to be added, the method 500 may continue by again presenting the appropriate options to the user (block 508). Otherwise, the method 500 may continue by determining physical sizes associated with the virtual objects within the virtual environment (520). With the size information, the mobile computing device 110 may access repair or replacement cost data (block 522) and generate cost estimates associated with repairing or replacing physical objects represented by the adjusted virtual objects (and the pointer objects, as appropriate) (block 524). A report may be generated using the cost estimates (block 526), and the report may be presented or stored for review by the user or another review (block 528).

At block 502, the AR damage assessment method 500 may begin by capturing physical environment data using one or more sensors 108 of the mobile computing device 110. The physical environment data may include location or movement data indicating absolute or relative location of the mobile computing device 110 within the physical environment generated using the sensors 108, such as the accelerometer 252. The physical environment data may also include visual data regarding the physical environment captured using the camera 254, which may include a plurality of images captured at a plurality of locations within the physical environment. In some embodiments, additional physical environment data may be captured using the sensors 108, such as distance measurements using infrared sensors, LIDAR, sonar, or other direct distance measurement sensors incorporated within or connected to the mobile computing device 110. The location or movement data may be combined with the visual data to determine the positions (i.e., locations, directions, and orientations) of the images of the physical environment at multiple locations within the environment. While information regarding the positions of the captured images may not be sufficiently specific relative to external positioning systems, the relative positions of the images can nonetheless be accurately tracked relative to the other images using the sensors 108 (e.g., the accelerometer 252) of the mobile computing device 110. Such relative positions may be sufficient to construct a virtual representation of the local physical environment.

At block 504, the mobile computing device 110 may generate a virtual space using the captured physical environment data. The virtual space may be generated using the location or movement data to establish three orthogonal coordinate axes, from which the position of the mobile computing device 110 may be determined relative to the coordinate axes. In some embodiments, visual data may be used to generate the virtual space. For example, the virtual space may be anchored to a feature extracted from multiple images, such as a horizon or other edge identified within the images using visual processing techniques (e.g., application of filters to identify edges or other salient features of the images). In further embodiments, objects within the virtual environment may be similarly identified by the mobile computing device 110 based upon the captured visual data or other captured physical environment data. Such objects may include surfaces (e.g., walls, ceilings, floors, tabletops, or windows) or other objects (e.g., chairs, trees, or tables) within the physical environment. These objects (particularly surfaces) may be used to place virtual objects within the virtual space, such as the virtual objects 420a, b and 421-424 and pointer object 425 discussed above. The virtual space may be generated and managed within the mobile computing device 110 using the virtual space management application 232, which may include a 3-D modeling engine and one or more routines to generate and update the AR environment presentation of the virtual space. Various software tools for handling such AR environments may be used to generate and manage the virtual space, such as the ARKit produced by Apple Inc.

At block 506, the mobile computing device 110 may present a representation of the virtual space to the user via the display 202. Presenting the virtual space to the user may include presenting images of the physical environment captured by the camera 254 of the mobile computing device 110 in real time as the user repositions the mobile computing device 110 within the physical environment, while overlaying virtual objects on such images. The virtual objects may be overlaid on the images based upon the relative positions of the mobile computing device 110 and the virtual object within the virtual space. Since the virtual objects are fixedly positioned within the virtual space (except as repositioned by the user), the size and shape of the virtual objects represented on the display 202 will change as the user moves the mobile device 110 through the physical environment (i.e., as the relative position of the mobile computing device 110 within the virtual space changes). Thus, the virtual objects presented to the user on the display 202 appear to be 3-D objects within the physical environment, such that the user may view any side of the virtual object from any distance by moving the mobile computing device 110 through the physical environment, while images of the physical environment are displayed behind the virtual objects in real time as captured by the camera 254 based upon the position of the mobile computing device 110.

At block 508, the mobile computing device 110 may present one or more options to select or otherwise indicate virtual objects or pointer objects to place within the virtual space. The options may be presented as a set of selectable types of objects, as illustrated above in FIG. 4B, in some embodiments. In other embodiments, the options may be presented as configuration options for a generic object indicated by a user action associated with a location (e.g., by tapping, circling, or dragging an area of the display 202), or by other similar techniques. The virtual objects may be associated with types of physical objects, such as structural components of buildings or vehicles. For example, a virtual object may be representative of a component of a building structure, such as a window, a door, a drywall wall segment, a brick wall segment, a stone wall segment, a siding segment, a roofing shingle segment, a carpet floor segment, a tile floor segment, a wood floor segment, or a concrete floor segment. As another example, a virtual object may be representative of a component of a specific or generic vehicle, such as a windshield, a bumper, a hood, a door, a side view mirror, a wheel, a light housing, a trunk, a roof panel, or a side panel. In some embodiments, the options may include an option to create a custom virtual object class or to import a virtual object class, in which case the mobile computing device 110 may receive user input or access data defining the virtual object class. For example, the mobile computing device 110 may access a class of virtual objects from a data source 170 for specialized types of objects, such as components of particular makes or models of vehicles.

At block 510, the mobile computing device 110 may receive an indication of a user selection of a virtual object or pointer object to place within the virtual space. The virtual object or pointer object may be selected by the user to represent a component or object within the physical environment that is damaged. The selected virtual object or pointer object in the virtual space may thus correspond to a physical object to be repaired or replaced within the physical environment. In some embodiments, the object selection indicated by the user may indicate the type or class of virtual object or pointer object. In further embodiments, multiple selections may be received from the user to indicate a particular type of virtual object or pointer object. For example, one or more levels of sub-types of virtual objects may be presented to the user in a hierarchical menu of options (e.g., door objects, security door objects, metal security door objects, etc.). In some embodiments, the user may first select a virtual object or pointer object (or a type or class of virtual object or pointer object), then subsequently select a location within the virtual space at which to place the selected object. Such methods may include tapping and dragging a virtual object or pointer object to a location within the virtual space using a touchscreen display. In other embodiments, the user may select a location for the object prior to or simultaneously with selection of the virtual object or pointer object.

At block 512, the mobile computing device 110 may receive a user selection of a location within the virtual space at which to place the object. The location may be selected by the user by indicating a point or area within the representation of the virtual space presented to the user via the display 202. To aid in user selection of the location, the virtual object may be presented to the user in a default location or in a location predicted based upon the type of the virtual object and identified objects within the virtual space (e.g., a window object may be automatically placed on a wall), in which case the user may drag the virtual object to a desired location within the virtual space. In some embodiments, the location selection may further include an orientation of the virtual object within the virtual space. Such orientation may be either explicitly indicated by the user or may be implicitly determined as a default orientation relative to the position and orientation of the mobile computing device 110 (e.g., windows may always be oriented directly facing the user and perpendicular to an assumed floor, with the top of the window nearest to the top of the display 202). In some embodiments, the virtual object may be automatically positioned based upon objects or surfaces within the virtual space that have been identified based upon the captured environmental data as existing within the physical environment. Thus, virtual objects may be positioned in a coplanar or orthogonal orientation to surfaces identified within the virtual space. For example, a window or door may be automatically snapped into position along a wall in the virtual space when the user indicates a location near the wall via the mobile computing device 110. Pointer objects may be similarly oriented, or they may lack intrinsic orientation, instead being oriented upright and facing the user from every position of the mobile computing device 110.

At block 514, the mobile computing device 110 may receive a user selection of a size or shape of the virtual object within the virtual space or may receive a user comment associated with a pointer object within the virtual space. The user may select the size or shape by indicating a preferred size or shape of all or part of the virtual object. This may include scaling, rotating, or transforming the virtual object to match a size and shape of a corresponding physical object within the physical environment. For example, a user may adjust a virtual object representing a window to match the location, size, shape, and orientation of a broken window within the physical environment. By adjusting the virtual object to be an adjusted virtual object matching the position of a damaged object (or portion thereof) within the virtual space, the user enables the mobile computing device 110 to automatically generate detailed information regarding the extent of damage, as described elsewhere herein. In some embodiments, the size or shape of the adjusted virtual object may be suggested based upon automated assessment of visual data or other physical environment data. For example, edges of a window may be detected by iterative filtering of camera images, which may be suggested to the user as a selectable option for adjusting a window virtual object placed nearby.

In some embodiments, the virtual object may be adjusted to include additional information regarding the physical object, or such additional information may be included in a pointer object as a user comment. Thus, a user comment may be received and associated with the virtual object or pointer object. Such user comments may indicate a condition within the physical environment to be repaired or remediated (e.g., water damage, mold, or smoke damage), which may be associated with an object in the physical environment or may be a more general condition associated with a plurality of objects within the physical environment. The user commend may be entered as text, as an image captured by the camera 254, as an audio comment recorded using the microphone 256, or as another sort of indication (e.g., a selection of a checkbox associated with a pointer object). In some embodiments, the user comment may include an estimate of the extent of damage associated with a condition or object within the physical environment (e.g., a repair or replacement cost, time, or difficulty level).

At block 516, the mobile computing device 110 may update the virtual space to include the adjusted virtual object or pointer object. Updating the virtual space may include storing data defining the adjusted virtual object or pointer object in a data storage 222 of the mobile computing device 110 or the database 146 of the server 140. Updating the virtual space may likewise include presenting a representation of the adjusted virtual object or pointer object to the user at the indicated positions within a representation of the virtual space via the display 202. The virtual space may also be updated to present renderings of appropriate alternative views of the adjusted virtual object or pointer object as the user moves the mobile computing device 110 through the physical environment. In this manner, the adjusted virtual object or pointer object appears as a 3-D object within the virtual space using the mobile computing device 110 as an AR system.

At block 518, the mobile computing device 110 may determine whether another virtual object or pointer object is to be added to the virtual space. Such determination may be assumed until the user requests a report or other assessment of the extent of damage. In some embodiments, the user may be prompted to indicate whether to add another virtual object or pointer object. The user may also indicate a modification, revisions, repositioning, resizing, or deletion of an existing virtual object or pointer object in some embodiments, which may be handled in a similar manner to the addition of a new virtual object or pointer object. If the mobile computing device 110 determines that an additional object is to be added to the virtual space at block 518, the method 500 may continue with presentation of options to the user to select a virtual object or pointer object at block 508, as discussed above. If the mobile computing device 110 determines that additional objects are not to be added to the virtual space at block 518, the method 500 may continue with a determination of physical sizes of adjusted virtual objects at block 520.

At block 520, the mobile computing device 110 may determine physical sizes of physical objects associated with the adjusted virtual objects in the virtual space. Because the mobile computing device 110 tracks its relative position within the physical environment and the positions of virtual objects therein relative to physical movements of the mobile computing device 110, the virtual space management application 232 manages the virtual space relative to physical environment positions and distances. For example, when the mobile computing device 110 is moved five feet in the physical environment, the virtual space management application 232 must adjust its location in the virtual environment by a corresponding amount. Thus, the virtual space directly maps onto the physical environment, and the physical environment directly maps onto the virtual space. This enables the physical sizes of objects within the physical environment to be determined based upon virtual sizes of corresponding virtual objects within the virtual space. In some embodiments, the virtual space may be managed in terms of physical distances, thereby simplifying the physical size determination. Regardless of the type of mapping, the mobile computing device 110 can readily determine the length, width, and depth of any virtual object in the virtual space, which dimensions are directly proportional to the physical dimensions of a corresponding physical object within the physical environment. The virtual space measurement and conversion to physical dimensions may be performed by the virtual object measurement routine 248 of the mobile computing device 110. The physical sizes may be generated as any convenient measurements and may differ between types of virtual objects. For example, the physical size associated with a carpet virtual object may be determined in square feet as one total number, while the physical size associated with a door virtual object may be generated in three measurements of height, width, and depth.

At block 522, the mobile computing device 110 may access data regarding repair or replacement costs. The repair or replacement cost data may be indicative of costs associated with repairing or replacing physical objects or components, and such data may further include remediation costs associated with remediation of conditions within physical environments (e.g., water damage or smoke damage). Such data may be accessed from the data storage 222 of the mobile computing device 110, from a database 146 associated with the server 140, or from an additional data source 170. The data regarding repair or replacement costs may be indicative of average costs associated with repairing or replacing physical objects or components thereof, or the data may be indicative of ranges of such costs. In some embodiments, the cost data may include total costs for repair or replacement, while the cost data may include separate components for materials, labor, delivery, or other relevant costs in other embodiments. The data may be structured to match the types of the virtual objects or categories of pointer objects to facilitate damage assessment. In some embodiments, the data may be specific to a geographical area or region (e.g., a state, county, metropolitan area, city, or portion thereof). To determine the appropriate cost data based upon geography, the mobile computing device 110 may further determine its geographic location using the GPS unit 250. Based upon the determined location, the mobile computing device 110 may access data associated with a geographic area including the determined location. Such geographic data may be particularly relevant for labor costs, which vary significantly between locations.

At block 524, the mobile computing device 110 may determine cost estimates associated with repairing, replacing, or remediating objects, components, or conditions within the physical environment. Such cost estimates may be separately determined for each of at least some of the virtual objects (i.e., adjusted virtual objects) and pointer objects within the virtual space. For example, cost estimates may be determined for each adjusted virtual object and for those pointer objects including sufficient information to determine a cost estimate, while cost estimates may not be determined for pointer objects that simply indicate general information. The cost estimates may be determined based upon the sizes of the corresponding virtual objects or information indicated in user comments associated with pointer objects. The sizes of the adjusted virtual objects may be used to determine specific types of physical objects within general categories indicated by the type of the virtual object (e.g., sizes or types of doors or windows). The sizes of the adjusted virtual objects may alternatively be used simply for estimating the amount of a component to be repaired or replaced (e.g., the amount of siding or carpet to be replaced). In some embodiments, cost estimates may be separately determined for repairing or replacing each object or component indicated by a virtual object or pointer object, and the determination to repair or to replace the object or component may be made based upon a comparison of the costs. Thus, mobile computing device 110 may determine whether to repair or to replace an object or component based upon which option has a lower estimated cost, which may include costs associated with time and labor. The cost estimates may be determined as individual average cost estimates for each object, individual cost estimate ranges for each object, a total cost estimate for all objects, or a total cost estimate range for all objects. In some embodiments, cost estimates may be divided into costs for materials and components, labor, or other costs. In further embodiments, estimates of repair or replacement time may be similarly determined based upon accessed data. Such time estimates may include time require for work to be performed, as well as time required for materials or components to be ordered and delivered, permits to be obtained, or any other time required to complete the repair, replacement, or remediation.

At block 526, the mobile computing device 110 may generate a report including indications of one or more cost estimates associated with the virtual objects or pointer objects. The report may include a list of cost estimates or ranges for the virtual objects or pointer objects. In some embodiments, additional adjustments or comments indicated by the user may also be included. The report may include supporting documentation, such as images of the physical environment, which may be two-dimensional images of portions of the physical environment with or without adjusted virtual objects. Such images or corresponding user comments may be useful to the user for later analysis of the extent or cause of damage, such as in determinations of an amount of damage that is covered under a policy or in recovering damages from a third party at fault for the damage. In alternative embodiments, the report may be generated as a set of data, or the report may be generated as a virtual document.

At block 528, the mobile computing device may present or store the generated report. The report may be presented to the user via the display 202 for review, revision, or approval. Additionally, or alternatively, the report may be stored locally in the data storage 222 or remotely in the database 146 by transmission through the network 130. In some embodiments, the user may save the report for further analysis or revision at a later time. For example, the report may include information defining the virtual objects and pointer objects, enabling the user to retrieve and modify these objects (or add new objects) at a later time. Following presentation or storage of the report, the method 500 may terminate.

Other Damage or Loss Assessment

Although the foregoing discussion primarily discusses damage assessment using AR by generating a virtual space representing a building or some portion thereof, other uses of the methods and systems described are envisioned. The methods and systems described above apply equally to other uses with appropriate modifications, primarily modifications to the types of virtual objects and data sources used to estimate costs associated with the damages. In further embodiments, other types of physical infrastructure may be similarly assessed, such as bridges, dams, embankments, walls, levies, parking lots, parking garages, docks, ramps, roads, or other infrastructure. Corresponding virtual objects may be indicative of concrete, brick, compact earth, steel, or other reinforcements, walls, columns, roofs, or beams.

In yet further embodiments, the methods and systems describe above may be applied to vehicles, such as cars, trucks, boats, motorcycles, airplanes, or trains. For example, the virtual objects may correspond to components of a vehicle, such as a windshield, a bumper, a hood, a door, a side view mirror, a wheel, a light housing, a trunk, a roof panel, or a side panel. The user may select, position, and resize the virtual objects to match damaged components of the vehicle. In some embodiments, the virtual objects may be generic virtual objects representing general components found in many vehicles. In other embodiments, the virtual objects may be selected for a specific make and model of vehicle, in order to better fit the design of the damaged vehicle. In either case, the user may select, place, position, and/or adjust the virtual objects within a virtual space representing a physical environment containing the vehicle. Pointer objects may also be added to indicate further conditions, such as broken axels or water damage. From such virtual objects or pointer objects indicated by the user, the mobile computing device 110 may determine the extent of damage and may generate a report, as discussed above.

Additional Considerations

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed is:

1. A computer-implemented method of automatically assessing extent of damage or loss in a physical environment using an augmented reality representation of a virtual space corresponding to the physical environment, comprising:
    capturing, by a camera of a mobile device, visual data regarding the physical environment;
    generating, by one or more processors, the virtual space based upon the captured visual data regarding the physical environment;
    receiving, at the one or more processors, a user selection of a virtual object to place within the virtual space, wherein the virtual object is associated with a physical object to be repaired or replaced within the physical environment;
    presenting, via a display of the mobile device, the virtual object within the virtual space based upon the user selection;
    receiving, at the one or more processors, a user indicator of a size of the virtual object within the virtual space at a location within the virtual space;
    determining, by the one or more processors, a physical size of the physical object in the physical environment based upon the size of the virtual object within the virtual space;
    adding and adjusting at least one new virtual object adjacent to the virtual object to the virtual space, the at least one new virtual object being associated with at least one additional physical object be repaired or replaced within the physical environment;
    accessing, from a memory communicatively connected to the one or more processors, data regarding costs associated with the physical object and the at least one additional physical object;
    determining, by the one or more processors, a cost associated with repairing or replacing the physical object and the at least one additional physical object based upon the accessed data and the determined size of the virtual object; and
    presenting, via the display, an indication of the determined cost associated with repairing or replacing the physical object to the user.

2. The computer-implemented method of claim 1, wherein the physical object is one or more of the following components of a building structure: a window, a door, a drywall wall segment, a brick wall segment, a stone wall segment, a siding segment, a roofing shingle segment, a carpet floor segment, a tile floor segment, a wood floor segment, or a concrete floor segment.

3. The computer-implemented method of claim 1, wherein the physical object is one or more of the following components of a vehicle: a windshield, a bumper, a hood, a door, a side view mirror, a wheel, a light housing, a trunk, a roof panel, or a side panel.

4. The computer-implemented method of claim 1, further comprising:
    determining, by a Global Positioning System (GPS) receiver of the mobile device, a geographic location of the physical environment,
    wherein accessing the data regarding costs associated with the physical object further includes accessing data associated with costs within an area including the geographic location.

5. The computer-implemented method of claim 4, wherein determining the cost associated with repairing or replacing the physical object further includes determining one or more costs associated with materials and one or more costs associated with labor within the area including the geographic location.

6. The computer-implemented method of claim 1, further comprising:
    receiving, at the one or more processors, a user indication of a condition location of a pointer object, wherein the pointer object is associated with a user comment regarding an additional condition to be repaired within the physical environment; and
    presenting, via the display, the pointer object within the virtual space.

7. The computer-implemented method of claim 6, wherein determining the cost associated with repairing or replacing the physical object further includes determining one or more costs associated with the pointer object based upon the user comment.

8. The computer-implemented method of claim 6, further comprising:
    recording, via a microphone of the mobile device, the user comment as an audio comment.

9. The computer-implemented method of claim 1, further comprising:
    generating, by the one or more processors, one or more two-dimensional images of the physical environment and the virtual object;
    generating, by the one or more processors, a report including the one or more two-dimensional images and information regarding the determined cost associated with repairing or replacing the physical object; and
    storing, in a memory of the mobile device, the report.

10. The computer-implemented method of claim 1, wherein receiving the user selection of the virtual object includes (i) receiving a first user selection of a type of the virtual object and (ii) receiving a second user selection of the location of the virtual object within the virtual space.

11. A computer system for automatically assessing extent of damage or loss in a physical environment using an augmented reality representation of a virtual space corresponding to the physical environment, comprising:
    one or more processors;
    one or more cameras communicatively connected to the one or more processors;
    one or more displays communicatively connected to the one or more processors; and
    a non-transitory program memory communicatively coupled to the one or more processors and storing executable instructions that, when executed by the one or more processors, cause the computer system to:
        capture visual data regarding the physical environment via the one or more cameras;
        generate the virtual space based upon the captured visual data regarding the physical environment;
        receive a user selection of a virtual object to place within the virtual space, wherein the virtual object is associated with a physical object to be repaired or replaced within the physical environment;
        present the virtual object within the virtual space via the one or more displays based upon the user selection;

receive a user indicator of a size of the virtual object within the virtual space at a location within the virtual space;

determine a physical size of the physical object in the physical environment based upon the size of the virtual object within the virtual space;

add and adjust at least one new virtual object adjacent to the virtual object to the virtual space, the at least one new virtual object being associated with at least one additional physical object be repaired or replaced within the physical environment;

access data regarding costs associated with the physical object and the at least one additional physical object;

determine a cost associated with repairing or replacing the physical object and the at least one additional physical object based upon the accessed data and the determined size of the virtual object; and present an indication of the determined cost associated with repairing or replacing the physical object to the user via the one or more displays.

12. The computer system of claim 11, further comprising a Global Positioning System (GPS) receiver; and wherein the executable instructions further cause the computer system to determine a geographic location of the physical environment using the GPS receiver, and wherein the executable instructions that cause the computer system to access the data regarding costs associated with the physical object further cause the computer system to access data associated with costs within an area including the geographic location.

13. The computer system of claim 12, wherein the executable instructions that cause the computer system to determine the cost associated with repairing or replacing the physical object further cause the computer system to determine one or more costs associated with materials and one or more costs associated with labor within the area including the geographic location.

14. The computer system of claim 11, wherein the executable instructions further cause the computer system to:

receive a user indication of a condition location of a pointer object, wherein the pointer object is associated with a user comment regarding an additional condition to be repaired within the physical environment; and present the pointer object within the virtual space.

15. The computer system of claim 14, wherein the executable instructions that cause the computer system to determine the cost associated with repairing or replacing the physical object further cause the computer system to determine one or more costs associated with the pointer object based upon the user comment.

16. A tangible, non-transitory computer-readable medium storing executable instructions for automatically assessing extent of damage or loss in a physical environment using an augmented reality representation of a virtual space corresponding to the physical environment that, when executed by at least one processor of a computer system, cause the computer system to:

capture visual data regarding the physical environment via a camera of a mobile device;

generate the virtual space based upon the captured visual data regarding the physical environment;

receive a user selection of a virtual object to place within the virtual space, wherein the virtual object is associated with a physical object to be repaired or replaced within the physical environment;

present the virtual object to the user within the virtual space via a display of the mobile device based upon the user selection;

receive a user indicator of a size of the virtual object within the virtual space at a location within the virtual space;

determine a physical size of the physical object in the physical environment based upon the size of the virtual object within the virtual space;

add and adjust at least one new virtual object adjacent to the virtual object to the virtual space, the at least one new virtual object being associated with at least one additional physical object be repaired or replaced within the physical environment;

access data regarding costs associated with the physical object and the at least one additional physical object;

determine a cost associated with repairing or replacing the physical object and the at least one additional physical object based upon the accessed data and the determined size of the virtual object; and present an indication of the determined cost associated with repairing or replacing the physical object to the user via the display.

17. The tangible, non-transitory computer-readable medium of claim 16, further storing executable instructions that cause the computer system to determine a geographic location of the physical environment using geolocation data from a Global Positioning System (GPS) receiver of the mobile device, and wherein the executable instructions that cause the computer system to access the data regarding costs associated with the physical object further cause the computer system to access data associated with costs within an area including the geographic location.

18. The tangible, non-transitory computer-readable medium of claim 17, wherein the executable instructions that cause the computer system to determine the cost associated with repairing or replacing the physical object further cause the computer system to determine one or more costs associated with materials and one or more costs associated with labor within the area including the geographic location.

19. The tangible, non-transitory computer-readable medium of claim 16, further storing executable instructions that cause the computer system to:

receive a user indication of a condition location of a pointer object, wherein the pointer object is associated with a user comment regarding an additional condition to be repaired within the physical environment; and present the pointer object within the virtual space.

20. The tangible, non-transitory computer-readable medium of claim 19, wherein the executable instructions that cause the computer system to determine the cost associated with repairing or replacing the physical object further cause the computer system to determine one or more costs associated with the pointer object based upon the user comment.

* * * * *